US008176286B2

(12) United States Patent
Nevill

(10) Patent No.: US 8,176,286 B2
(45) Date of Patent: May 8, 2012

(54) MEMORY RECYCLING IN COMPUTER SYSTEMS

(76) Inventor: Edward Colles Nevill, Hemingford Grey (GB)

( * ) Notice: Subject to any disclaimer, the term of this patent is extended or adjusted under 35 U.S.C. 154(b) by 2152 days.

(21) Appl. No.: 10/781,867

(22) Filed: Feb. 20, 2004

(65) Prior Publication Data

US 2004/0193828 A1    Sep. 30, 2004

(30) Foreign Application Priority Data

Mar. 26, 2003 (GB) .................................. 0306970.5

(51) Int. Cl.
*G06F 12/00* (2006.01)
(52) U.S. Cl. ........................................ 711/170; 707/816
(58) Field of Classification Search .................. None
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,587,632 A | 5/1986 | Ditzel | |
| 4,922,414 A * | 5/1990 | Holloway et al. ............. | 711/207 |
| 4,969,091 A | 11/1990 | Muller | |
| 5,136,696 A | 8/1992 | Beckwith et al. | |
| 5,355,483 A | 10/1994 | Serlet | |
| 5,455,775 A | 10/1995 | Huber et al. | |
| 5,619,665 A | 4/1997 | Emma | |
| 5,638,525 A | 6/1997 | Hammond et al. | |
| 5,644,709 A * | 7/1997 | Austin ............................ | 714/53 |
| 5,659,703 A | 8/1997 | Moore et al. | |
| 5,740,461 A | 4/1998 | Jaggar | |
| 5,742,802 A | 4/1998 | Harter et al. | |
| 5,752,035 A | 5/1998 | Trimberger | |
| 5,784,584 A | 7/1998 | Moore et al. | |
| 5,809,336 A | 9/1998 | Moore et al. | |
| 5,838,948 A | 11/1998 | Bunza | |
| 5,873,097 A * | 2/1999 | Harris et al. .................. | 707/203 |
| 5,875,336 A | 2/1999 | Dickol et al. | |
| 5,892,966 A | 4/1999 | Petrick et al. | |

(Continued)

FOREIGN PATENT DOCUMENTS

JP    11-312097    11/1999

(Continued)

OTHER PUBLICATIONS

Wilson, Paul R. "Uniprocessor garbage collection techniques" in Proc. of Interantional Workshop on Memory Management in Lecture Notes on Computer Science. Sep. 1992. Springer-Verlag. vol. 637. pp. 1-67. http://citeseer.ist.psu.edu/wilson92uniprocessor.html.*

(Continued)

*Primary Examiner* — Kaushikkumar Patel
(74) *Attorney, Agent, or Firm* — Nixon & Vanderhye P.C.

(57) ABSTRACT

Execution of a processing task within a data processing system is controlled by executing the processing task including allocating memory areas for data storage and then suspending an actual execution path of said processing task at a given execution point to perform memory management. The memory management involves identifying one or more data items occurring in the course of execution and accessible to the processing task at the given execution point, which specify reference values pointing to respective ones for the memory areas. A correlation is determined between reference values corresponding to identified data items and memory areas allocated during the execution up to the given execution point. A memory management operation is performed on allocated memory areas in dependence upon results of the correlation.

30 Claims, 7 Drawing Sheets

U.S. PATENT DOCUMENTS

| | | | |
|---|---|---|---|
| 5,925,123 | A | 7/1999 | Tremblay et al. |
| 5,926,832 | A | 7/1999 | Wing et al. |
| 5,937,193 | A | 8/1999 | Evoy |
| 5,953,741 | A | 9/1999 | Evoy et al. |
| 6,003,126 | A | 12/1999 | Huynh et al. |
| 6,009,499 | A | 12/1999 | Koppala |
| 6,009,509 | A | 12/1999 | Leung et al. |
| 6,014,723 | A | 1/2000 | Tremblay et al. |
| 6,021,469 | A | 2/2000 | Tremblay et al. |
| 6,026,485 | A | 2/2000 | O'Connor et al. |
| 6,031,992 | A | 2/2000 | Cmelik et al. |
| 6,038,643 | A | 3/2000 | Tremblay et al. |
| 6,070,173 | A | 5/2000 | Huber et al. |
| 6,088,786 | A | 7/2000 | Feierbach et al. |
| 6,122,638 | A | 9/2000 | Huber et al. |
| 6,125,439 | A * | 9/2000 | Tremblay et al. ............ 712/202 |
| 6,148,391 | A | 11/2000 | Petrick |
| 6,149,318 | A * | 11/2000 | Chase et al. ................. 717/131 |
| 6,167,535 | A | 12/2000 | Foote et al. |
| 6,212,612 | B1 * | 4/2001 | Turner ......................... 711/170 |
| 6,249,793 | B1 | 6/2001 | Printezis et al. |
| 6,286,016 | B1 | 9/2001 | Heller et al. |
| 6,298,434 | B1 | 10/2001 | Lindwer |
| 6,317,872 | B1 | 11/2001 | Gee et al. |
| 6,338,134 | B1 | 1/2002 | Leung et al. |
| 6,349,377 | B1 | 2/2002 | Lindwer |
| 6,374,286 | B1 | 4/2002 | Gee et al. |
| 6,427,154 | B1 | 7/2002 | Kolodner et al. |
| 6,442,751 | B1 * | 8/2002 | Cocchi et al. ................ 717/133 |
| 6,606,743 | B1 | 8/2003 | Raz et al. |
| 6,910,213 | B1 | 6/2005 | Hirono et al. |
| 2001/0042074 | A1 | 11/2001 | Kawamoto ................... 707/206 |
| 2002/0052926 | A1 * | 5/2002 | Bush et al. ................... 709/217 |
| 2003/0177152 | A1 * | 9/2003 | Darnell ......................... 707/206 |
| 2004/0039758 | A1 * | 2/2004 | Li ................................. 707/206 |

FOREIGN PATENT DOCUMENTS

| | | |
|---|---|---|
| JP | 2000-47931 | 2/2000 |
| JP | 2000-99351 | 4/2000 |
| JP | 2001-209572 | 8/2001 |
| WO | 00/29937 A2 | 5/2000 |
| WO | WO 01/50270 | 7/2001 |

OTHER PUBLICATIONS

Hosoya et al. "Garbage Collection via Dynamic Type Inference—A Formal Treatment—" in Types in Compilation: Second International Workshop in Lecture Notes in Computer Science. Mar. 1998. Springer Berlin / Heidelberg. vol. 1473. pp. 215-239.*

H. Stone, Chapter 12—"A Pipeline Push-Down Stack Computer", 1969, pp. 235-249.

C. Glossner et al, "Delft-Jaya Link Translation Buffer", Aug. 1998.

N. Vijaykrishnan et al, "Object-Oriented Architectural Support for a Java Processor" 1998, pp. 330-355.

C. Glossner et al, "The Delft-Java Engine: An Introduction", Aug. 1997.

K. Ebcioglu et al, "A Java ILP Machine Based On Fast Dynamic Compilation", Jan. 1997, pp. 1-13.

A. Wolfe, "First Java-specific chip takes wing" *EETimes*—1997.

Y. Pan, *Introduction to Computing Systems From Bits and Gates to C and Beyond*, 1999, pp. 1-517.

M. Ertl, "Stack Caching for Interpreters" 1994, pp. 1-10.

M. Ertl; "Stack Caching for Interpreters" 1995, pp. 1-13.

M. Ertl, "Implementation of Stack-Based Languages on Register Machines" Apr. 1996, pp. 1-4.

K. Andrews et al, "Migrating a CISC Computer Family Onto RISC Via Object Code Translation" 1992, pp. 213-222.

J. O'Connor et .al, "PicoJava I Microprocessor Core Architecture" Oct. 1996, pp. 1-8, Sun Microsystems.

M. Ertl; "A New Approach to Forth Native Code Generation" 1992.

M. Maierhofer et al, "Optimizing Stack Code" 1997, p. 1-9.

D. Ungar et al, "Architecture of SOAR: Smalltalk on a RISC" The 11th Annual International Symposium on Computer Architecture, Jun. 1984, pp. 188-197.

O. Steinbusch, "Designing Hardware to Interpret Virtual Machine Instructions" Feb. 1998, pp. 1-59.

R. Kapoor et al, "Stack Renaming of the Java Virtual Machine" Dec. 1996, pp. 1-17.

A. Yonezawa et al, "Implementing Concurrent Object-Oriented Languages in Multicomputers" *Parallel and Distributed Technology (Systems and Applications)* May 1993, pp. 49-61.

C. Hsueh et al, "Java Bytecode to Native Code Translation; The Caffeine Prototype and Preliminary Results" IEEE/ACM International Symposium on Microarchitecture, Dec. 1996, pp. 90-97.

Y. Patt et al, *Introduction to Computing Systems From Bits and Gates to C and Beyond*, 2001, pp. 1-526.

Sun Microsystems PicoJava Processor Core Data Sheet, Dec. 1997, pp. 1-11.

H. McGhan et al, PicoJava A Direct Execution Engine for Java Bytecode, Oct. 1998, pp. 22-26.

C. Glossner et al, "Parallel Processing" Euro-Par 1997: Passau, Germany, Aug. 1997.

Y. Patt; *Introduction to Computing Systems From Bits and Gates to C and Beyond*, 1999, pp. 10-12 & 79-82.

Espresso—The High Performance Java Core Specification, Oct. 2001, pp. 1-33, Aurora VLSI, Inc.

J. Gosling, "Java Intermediate Bytecodes" 1995, pp. 111-118.

P. Koopman, Jr. "Stack Computers The New Wave" 1989, pp. 1-234.

J. O'Connor et al,. "PicoJava-I: The Java Virtual Machine in Hardware" *IEEE Micro* A Case for Intelligent RAM, Mar./Apr. 1997, pp. 45-53.

M. Mrva et al, "A Scalable Architecture for Multi-Threaded JAVA Applications" Design Automation and Test in Europe, Feb. 1998, pp. 868-874.

L. Chang et al, "Stack Operations Folding in Java Processors" *IEEE Proc.—Comput. Digit. Tech.*, vol. 145, No. 5, pp. 333-340 Sep. 1998.

L. Ton et al, Proceedings of the '97 International Conference on Parallel and Distributed Systems, "Instruction Folding in Java Processor", pp. 138-143, Dec. 1997.

K. Buchenrieder et al, "Scalable Processor Architecture for Java With Explicit Thread Support" *Electronics Letters* vol. 33, No. 18, pp. 1532+, Aug. 1997.

C. Chung et al, Proceedings of the '98 International Conference on Parallel and Distributed Systems, "A Dual Threaded Java Processor for Java Multithreading" pp. 693-700, Dec. 1998.

I. Kazi et al, "Techniques for Obtaining High Performance in Java Programs" Sep. 2000, pp. 213-240.

R. Kieburtz, "A RISC Architecture for Symbolic Computation" 1987, pp. 146-155.

M. Berekovic et al, "Hardware Realization of a Java Virtual Machine for High Performance Multimedia Applications", pp. 479-488, 1997.

M. Ibrahim et al.; "Signal Processing Systems (*SIPS 97*) *Design and Implementation*"; 1997 IEEE Workshop, Nov. 1997.

P. Deutsch, "Efficient Implementation of the Smalltalk-80 System" 1983, pp. 297-302.

J. Davis; "Rockwell Produces Java Chip" Sep. 1997, CNET News. Com, pp. 1 of 3.

Y. Patt et al, *Introduction to Computing Systems from Bits and Gates to C and Beyond*, 2001, pp. 1-16, 91-118 & 195-209.

List of Cited References issued by Japanese Patent Office Apr. 14, 2009 in corresponding JP application.

Japanese Office Action dated Aug. 26, 2011 in corresponding JP application.

K. Inui, "RealTime Java, Real-time Garbage Collector and Scheduler for RealTime Java" *Omron Technics*, vol. 38, No. 1, pp. 50-55, Mar. 20, 1998.

Y. Matsumoto, "Ruby" *TransTECH*, Aug. 1999, pp. 47-59.

List of Cited References issued by Japanese Patent Office Nov. 10, 2009 in corresponding JP application.

* cited by examiner

MEMORY RECYCLING IN COMPUTER SYSTEMS

BACKGROUND OF THE INVENTION

1. Field of the Invention

The present invention relates memory recycling processes or "garbage collection" in computer systems.

2. Description of the Prior Art

Many modern programming languages allow the programmer to dynamically allocate and reclaim memory. Dynamically allocated storage is often automatically managed during execution of a computer program using a process known as garbage collection. A particular example of a programming language that uses garbage collection is Java. Java is an object-oriented programming language. In object-oriented programming systems a "class" can provide a template for the creation of "objects" (i.e. data items) having characteristics of that class. Objects are typically created dynamically (in Java, using an operator called the "new" operator) during program execution. Methods associated with a class typically operate on objects of the same class.

Java source code is compiled to produce runtime code known as bytecode. However the bytecode is not the binary code of any existing computer. Rather, Java bytecode is an architecture-neutral machine code that can be interpreted to run on any specific computer. A Java program is executed by running an interpreter program called a Java Virtual Machine (JVM). The JVM reads the bytecode program and interprets or translates it to the native instruction set of the computer on which it is installed. The bytecode will run on any computer platform on which a JVM is installed without any need for recompilation of the source code. A process called "bytecode verification" is used as part of the linking of a Java program, prior to execution. The verification process ensures that the bytecode adheres to a set of rules defining well-formed Java class files. For example, if the verifier fails to confirm that a method in a class file pushes two integers onto an operand stack before executing an "iadd" (i.e. integer addition) instruction, the verifier will reject that class file.

Java allows multi-threaded execution of processes. A thread (abbreviation for "thread of control") is a sequence of execution within a process. A thread is a lightweight process to the extent that it does not have its own address space but uses the memory and other resources of the process in which it executes. There may be several threads in one process and the JVM manages the threads and schedules them for execution. Threads allow switching between several different functions executing simultaneously within a single program. When the JVM switches from running one thread to another thread, a context switch within the same address space is performed.

Garbage collection relieves programmers from the burden of explicitly freeing allocated memory and helps ensure program integrity by reducing the likelihood of incorrectly deallocating memory. However, a potential disadvantage of garbage collection is that at unpredictable times, a potentially large amount of garbage collection processing will be initiated when there is a need for more memory. In Java this problem is sometimes ameliorated by the multi-threaded nature of the system, which can allow the garbage collection to run in parallel with the user code. A garbage collection algorithm must perform two basic functions. Firstly, it must determine which objects are suitable for reclamation as garbage and secondly it must reclaim the memory space used by the garbage objects and make it available to the program. Garbage is defined as memory no longer accessible to the program.

The first stage of this process is typically performed by defining a set of "roots" and determining reachability from those roots. Objects that are not reachable via the roots are considered to be garbage since there is no way for the program to access them so they cannot affect the future course of program execution.

In the JVM the set of roots is implementation-dependent but will always include any object references in the local variables. The JVM comprises four basic components: registers; stack memory; heap memory; and a method area. All Java objects reside in heap memory and it is heap memory that is garbage-collected. Different pieces of storage can be allocated from and returned to the heap in no particular order. Memory allocated with the "new" operator in Java comes from the heap. The heap is shared among all of the threads. The method area is where the bytecodes reside. A program counter, which points to (i.e. contains the address of) some byte in the method area is used to keep track of the thread of execution. The Java stack is used to: store parameters for and results of bytecode instructions; to pass parameters to and return parameters from methods; and to keep the state of each method invocation. The JVM has few registers because the bytecode instructions operate primarily on the stack. The stack is so-called because it operates on a last-in-first-out basis. The state of a method invocation is called its "stack frame". Each method executing in a thread of control allocates a stack frame. When the method returns the stack frame is discarded.

In short, in the JVM all objects reside on the heap, the local variables typically reside on the stack and each thread of execution has its own stack. Each local variable is either an object reference or a primitive type (i.e. non-reference) such as an integer, character or floating point number. Therefore the roots include every object reference on the stack of every thread.

There are many known garbage collection algorithms including reference counting, mark and sweep and generational garbage collection algorithms. Details of these and other garbage collection algorithms are described in "*Garbage Collection, Algorithms for Automatic Dynamic Memory Management*" by Richard Jones and Raphaels Lins, published by John Wiley & Sons 1996.

Garbage collection algorithms may be categorised as either precise (exact) or imprecise (conservative) in how they identify and keep track of reference values in sources of references such as stacks. An imprecise garbage collector knows that a particular region of memory (e.g. a slot in a stack frame) may contain a reference but does not know where a given value stored in that particular region is a reference. The imprecise garbage collector must therefore keep any potential reference object alive. A disadvantage of this known technique is that a primitive type may be erroneously identified as a reference by the imprecise garbage collector if the variable value happens to coincide with a memory address. This means that a garbage object will be wrongly considered to be "live" by the imprecise collector, because an object-reference lookalike (i.e. the primitive type) referred to it.

Precise garbage collectors, on the other hand, can discriminate between a genuine object-reference and a primitive-type masquerading as a reference. Accordingly, precise garbage collectors alleviate the problem suffered by imprecise collectors of failure to garbage collect objects corresponding to object-reference lookalikes. To perform precise garbage collection, the system must be able to clearly distinguish between references and non-references. For objects, a "layout map" can be produced for each object describing which data fields of the object contain references. Reference identification for objects is relatively simple since the layout map will be invariant for the entire lifetime of the object and all objects of the same type have identical layout maps. However, the reference identification process is more complex for stack frames because the layout of a stack frame is likely to change during its lifetime. For example a given stack frame slot could be uninitialised at the start of the method, contain an integer for one block of the method and a reference for another block of the method.

There are currently two known methods for storing the information required for implementing precise garbage collection. The first involves building a series of stack maps during the bytecode verification stage. A "stack map" is a data structure that, for each execution point at which garbage collection may occur, represents a snapshot in time of the stack frame indicating the stack frame slots that contain references. Stack maps must be stored for a plurality of execution points in every verified method therefore this method is intensive on Random Access Memory (RAM).

The second involves keeping track of each stack write operation during execution of the verified bytecode and tagging each stack slot to which a reference is written and clearing the stack tag whenever a non-reference value is written to that stack location. This requires that the reference values and non-reference values written to the stack are self-describing i.e. each value has one or more bits used to indicate whether that value is a reference. The tag data itself may be stored either by widening the existing stack to include a tag field or by keeping a parallel stack. This stack-tagging process slows down execution of the program since both the stack and the variable must be marked as a reference or non-reference for each value written to stack.

Accordingly, it will be desirable to provide a precise garbage collection method that is less memory intensive and has less impact on program execution than known methods.

SUMMARY OF THE INVENTION

Viewed from one aspect the present invention provides a method of controlling execution of a processing task within a data processing system, said method comprising the steps of:

executing said processing task including allocating memory areas for data storage; and suspending an actual execution path of said processing task at an execution point to perform memory management, said memory management comprising the steps of:

identifying one or more data items occurring in the course of execution and accessible to said processing task at said execution point which specify reference values pointing to respective ones of said memory areas;

determining a correlation between reference values corresponding to identified data items and memory areas allocated during said execution up to said execution point; and performing a memory management operation on allocated memory areas in dependence upon said correlation.

To effectively reclaim memory space it is necessary to accurately identify which data items accessible to the processing task are reference values and which data items are non-reference values. Known memory recycling techniques either perform the analysis required to identify references at a verification stage prior to execution of the processing task or continuously monitor data write operations and log whether or not each written data item is a reference value. The invention recognises that the process of reference identification can be made less memory intensive and less processor intensive by performing the reference identification after execution of the processing task has commenced (i.e. post-verification) but only as and when required. The invention employs a technique whereby references are identified dynamically at the execution point at which garbage collection is initiated and does not rely upon previously stored information.

Although the process of identifying operand stack data items which specify reference values could be performed by exhaustively searching all possible execution paths up to the current execution point to find the actual execution path. Preferred embodiments of the invention recognize this is not necessary and operate such that any possible data path, for example the first encountered data path leading to the current execution point, is used to identify which operand stack entries correspond to references. This expedites the path-finding algorithm yet allows stack slots containing references to be reliably identified for any programming language that conforms to relevant constraints on instruction execution.

It will be appreciated that the memory management operation performed by embodiments of the invention could involve for example a tagging operation, a copying operation or a re-allocation operation. However, for preferred embodiments in which the data items are data items of the operand stack, the memory management operation comprises marking all memory areas that are accessible to the processing task either directly or indirectly through the identified data items which specify reference values. Any unmarked memory areas are then collected for re-allocation during subsequent execution of the processing task. Since the references are identified only as and when required, at the execution point at which the memory management operation is performed, such preferred embodiments offer more efficient memory recycling functionality than known garbage collection algorithms.

Although unmarked memory areas could be directly re-allocated during subsequent execution of the programming task, performing compaction of the unmarked memory areas prior to releasing them for re-allocation has the advantage of making available larger contiguous areas of memory to the processing task for re-allocation.

In identifying data items accessible to the processing task which specify references, where those data items represent local variables any local variable associated with a reference along any one of a plurality of possible execution paths could be categorised as a reference value, but its usage is imprecise. However, in preferred embodiments, local variables which are associated with different data types along different execution paths (and hence are of indefinite type) are distinguished from local variables of definite type by scanning the program instructions and categorizing variables as multiple-type, and therefore non-reference. All then possible execution paths up to the current execution point are simulated for each multiple-type variable in turn and the data type(s) at each program instruction for each of the execution paths is determined. The determined data type is then checked for the current execution point and the memory management operation is performed in dependence upon the result of this check. This has the advantage that memory areas associated with multiple-type variables having indefinite type at the current execution point can be effectively claimed for reallocation during the memory management operation. The identification of variables of indefinite type is significantly simplified by first identifying variables of multiple-type and subsequently performing a full data-flow analysis for only the subset of local variables categorised as multiple-type variables.

It will be appreciated that the present invention could be applied to a processing task associated with any computer programming language in which memory is dynamically allocated. However, preferred embodiments perform the processing task in an object-oriented programming language such as Smalltalk or Java. Particularly preferred embodiments perform the processing task in Java. Advantageously, the specification of the Java Virtual Machine means that the program code must adhere to rules which can be directly exploited to considerably simplify the algorithms used to identify which data items, such as local variables or operand stack values, correspond to references.

Viewed from another aspect the present invention provides a data processing apparatus operable to control execution of a processing task within a data processing system, said data processing apparatus comprising:

execution logic operable to execute said processing task including allocating memory areas for data storage; and task suspension logic operable to suspend an actual execution path of said processing task at an execution point to perform memory management;

reference identifying logic operable to identify one or more data items occurring in the course of execution and accessible to said processing task at said execution point which specify reference values pointing to respective ones of said memory areas;

correlation logic operable to determine a correlation between reference values corresponding to identified data items and memory areas allocated during said execution up to said execution point; and memory management logic operable to perform a memory management operation on allocated memory areas in dependence upon said correlation.

Viewed from a further aspect the present invention provides a computer program product bearing a computer program for controlling a computer to control execution of a processing task within a data processing system, said computer program comprising:

execution code operable to execute said processing task including allocating memory areas for data storage; and suspending code operable to suspend an actual execution path of said processing task at an execution point to perform memory management;

reference identifying code operable to identify one or more data items occurring in the course of execution and accessible to said processing task at said execution point which specify reference values pointing to respective ones of said memory areas;

correlating code operable to determine a correlation between reference values corresponding to identified data items and memory areas allocated during said execution up to said execution point; and memory management code operable to perform a memory management operation on allocated memory areas in dependence upon said correlation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
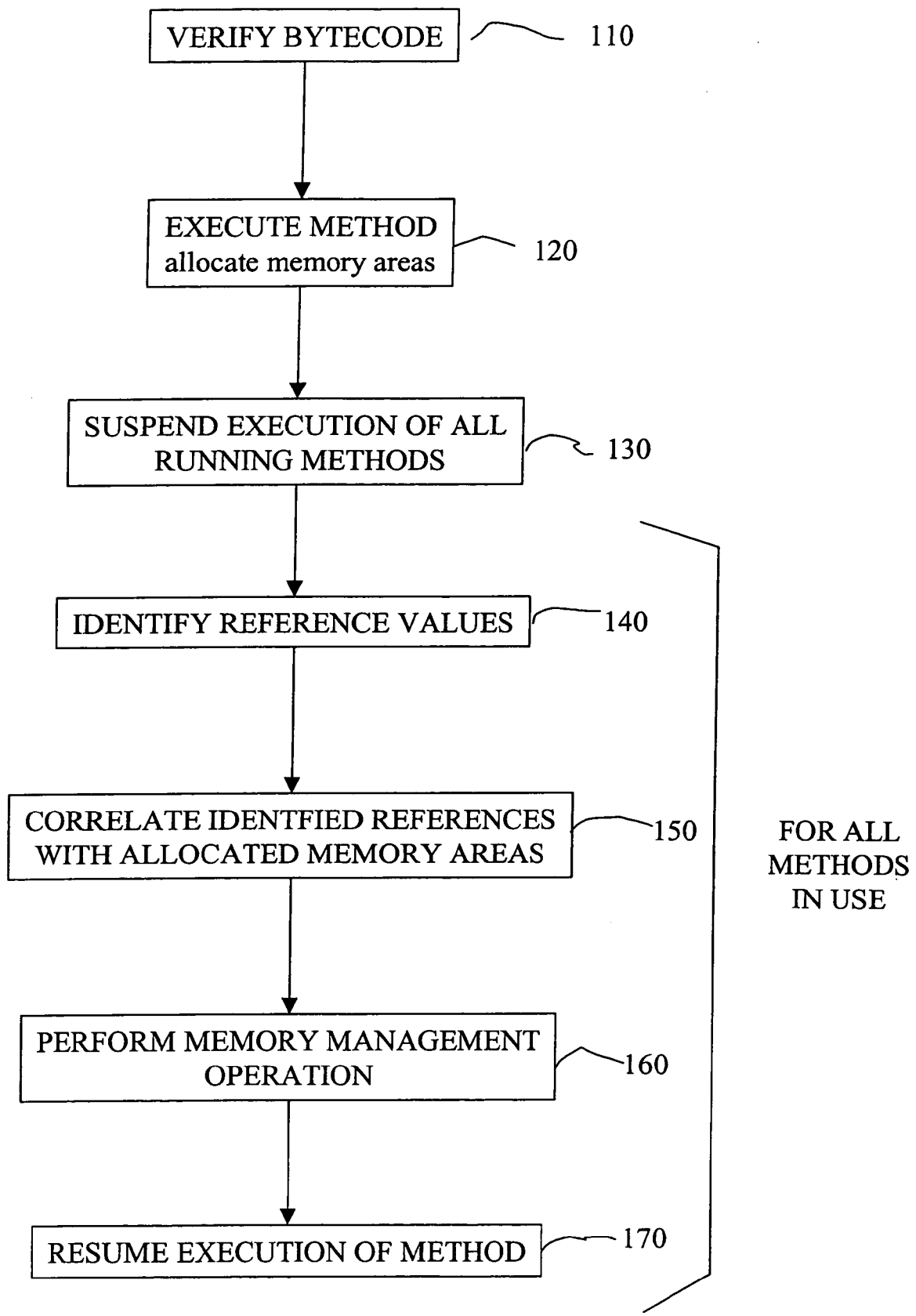
FIG. 1 is a flow diagram that schematically illustrates garbage collection according to the present technique.

FIG. 1 is a flow diagram that schematically illustrates garbage collection according to the present technique. The process starts at stage 110 where bytecode verification of a method is performed. The verification process ensures that the Java bytecode conforms to the rules of the JVM specification. The process then proceeds to stage 120 where the bytecode of the method is executed on the JVM. The heap is created upon start-up of the JVM and all class instantiations (i.e. objects) and arrays derive memory allocation from the heap during execution. At stage 130 execution of all running methods is suspended for the purpose of garbage collection. In this case the garbage collection is triggered by a request for memory allocation from an exhausted heap. The process proceeds to stage 140 where the first stage of garbage collection is performed. This involves identification of data values corresponding to reference values that form the roots of the program. Global variables, local variables (stored on stack frames) and objects are searched for references. At this stage a stack map corresponding to the execution point at which garbage collection was triggered is dynamically created. This differs from known methods which create a multiplicity of stack maps during bytecode verification and retrieve the stack map appropriate to the current execution point from memory. The identification of reference values corresponds to the initial stage of the marking process of "mark and sweep" algorithms. Once the reference values have been identified the process proceeds to stage 150 where the identified reference values are correlated with allocated heap memory areas to ascertain which heap objects are garbage. Stages 140 to 170 are performed for all methods in use.

Figure 2:
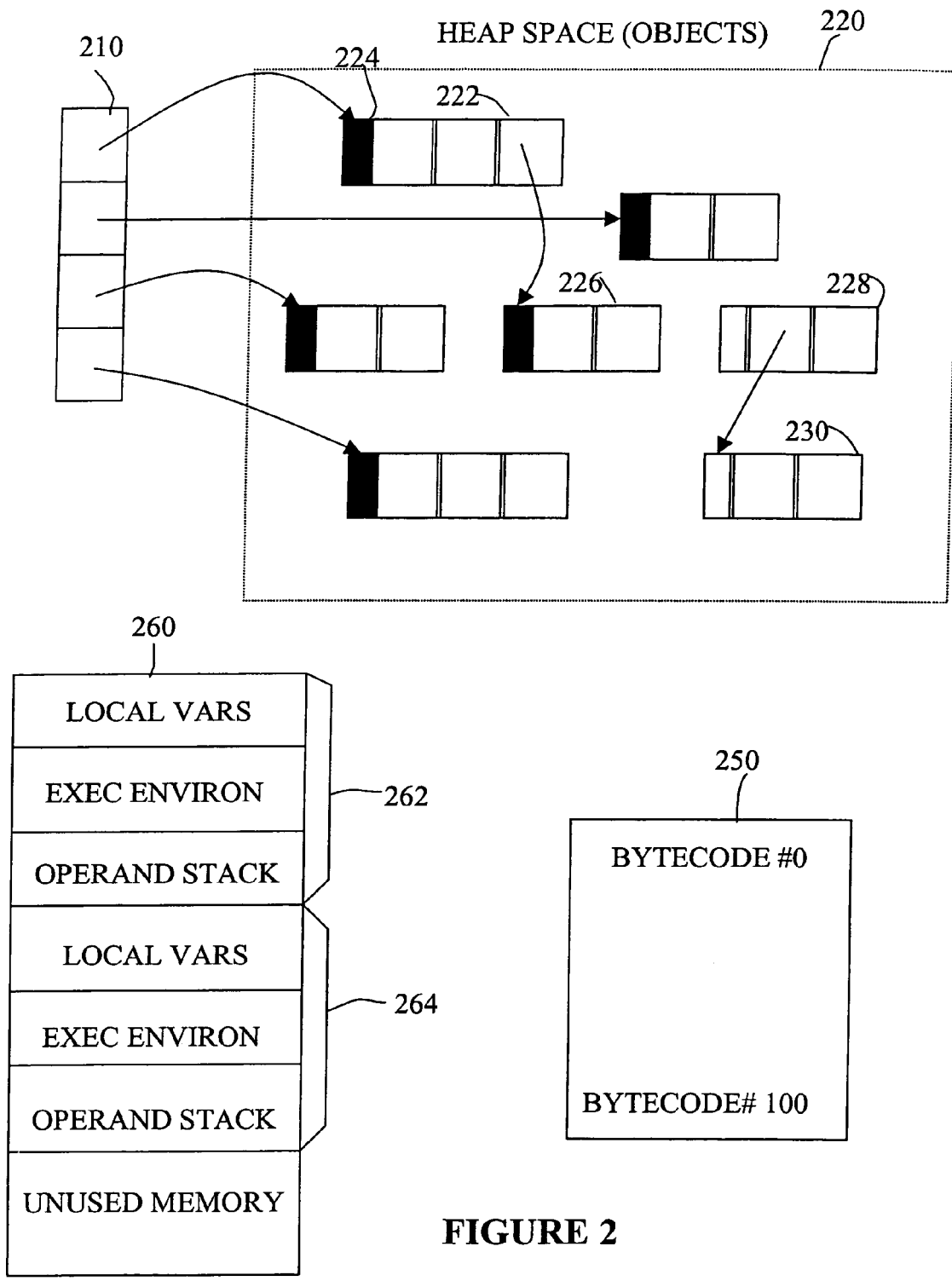
FIG. 2 schematically illustrates how identified reference values are correlated with heap memory areas to mark live objects.

FIG. 2 schematically illustrates the correlation process. FIG. 2 shows: a set of roots 210; a heap space 220 comprising a plurality of memory areas 222, 226, 228, 230; a stack 260 comprising two stack frames 262, 264; and a memory area 250 containing bytecodes for a processing task.

As shown in FIG. 2 each Java stack frame has three sections: the local variables; the execution environment; and the operand stack. Recall that each method has an associated stack frame. The local variables section contains all local variables being used by a current method invocation. The execution environment section is used to maintain operations of the stack itself. The operand stack is used as a workspace by bytecode instructions.

The values that a program can access directly are: those held in processor registers, those held on the program stack (including local variables and temporaries) and those held in global variables. The roots 210 of the computation are those directly accessible values that hold references (such as pointers or handles to a memory address) to heap 220 memory areas. Note that primitive types such as integers are not roots, only references can be roots. The roots 210 represent objects that are always accessible to the program. Root objects may themselves contain reference fields so a chain of references may be formed from each root. An object is considered to be live if any field in another live object references it. All objects that are reachable via the roots are considered live. FIG. 2 illustrates how starting from the roots 210 of the computation, the algorithm traverses a chain of references from each root and marks each data item reachable from a root by setting a mark-bit 224. During this process each data item visited when tracing a chain of references associated with a root is marked as a live object. For example object 222 is referenced by a root and a field in object 222 in turn contains a reference to the object 226. Accordingly, objects 224 and 226 have their mark-bits set indicating that they are live and therefore not available for garbage collection. An object is reachable from the roots if there is some path of references from the roots by which the executing program can access the object. Termination of the marking phase is enforced by not tracing from data items that have already been marked. Any data item that is left unmarked cannot be reached from a root and hence must be garbage. It can be seen that although data item 228 contains a reference to data item 230 neither of these data items is traceable via one of the roots 210 and hence they are garbage.

Referring back now to the flow chart of FIG. 1. Once the marking phase of the process is complete and the live memory areas have been discriminated from the garbage the process proceeds to stage 160 whereupon a memory management operation is performed. In this case at stage 160 a "sweep" operation is performed. During the sweep phase the garbage collector sweeps heap memory returning unmarked memory areas to the allocatable (free) pool of heap memory and clearing the mark bits of active cells in preparation for the next garbage collection cycle. A further memory management task that is performed at this stage is a process known as "compacting", which is used to combat heap fragmentation. The compacting involves moving live objects over free memory space towards one end of the heap. This leaves a contiguous free memory area at the other end of the heap. During compaction all references to moved live objects are updated to refer to the new location. Finally, at stage 170 the method resumes execution and the newly freed heap memory is available to the executing program for reallocation.

The method according to the present technique differs from known precise garbage collectors in that the reference values are identified by dynamic creation of a separate map corresponding to a snapshot in time at the execution point at which the garbage collection is initiated. Known precise garbage collectors form a plurality of such maps (stack maps) at the verification stage, all of which must be retained in RAM for subsequent use during program execution. There is significant redundancy in this known approach because the stored stack maps that are actually used will depend on the execution point at which garbage collection is initiated by the system. The present technique differs from the known technique in which reference flags are set in the objects themselves and the stack is marked for every write operation during program execution. In particular, although in both techniques the references are identified after execution of the processing task has commenced, according to the present technique the references are identified only as required at the execution points at which garbage collection is initiated.

Garbage collection according to the present technique focuses on more reliable and accurate identification of roots and live objects. This is achieved by performing two distinct strands of analysis: one strand involving finding references in the operand (or expression) stack and another strand involving finding references in a variable array and identifying multiple-type variables. We shall now consider each of these two strands in turn.

Figure 3:
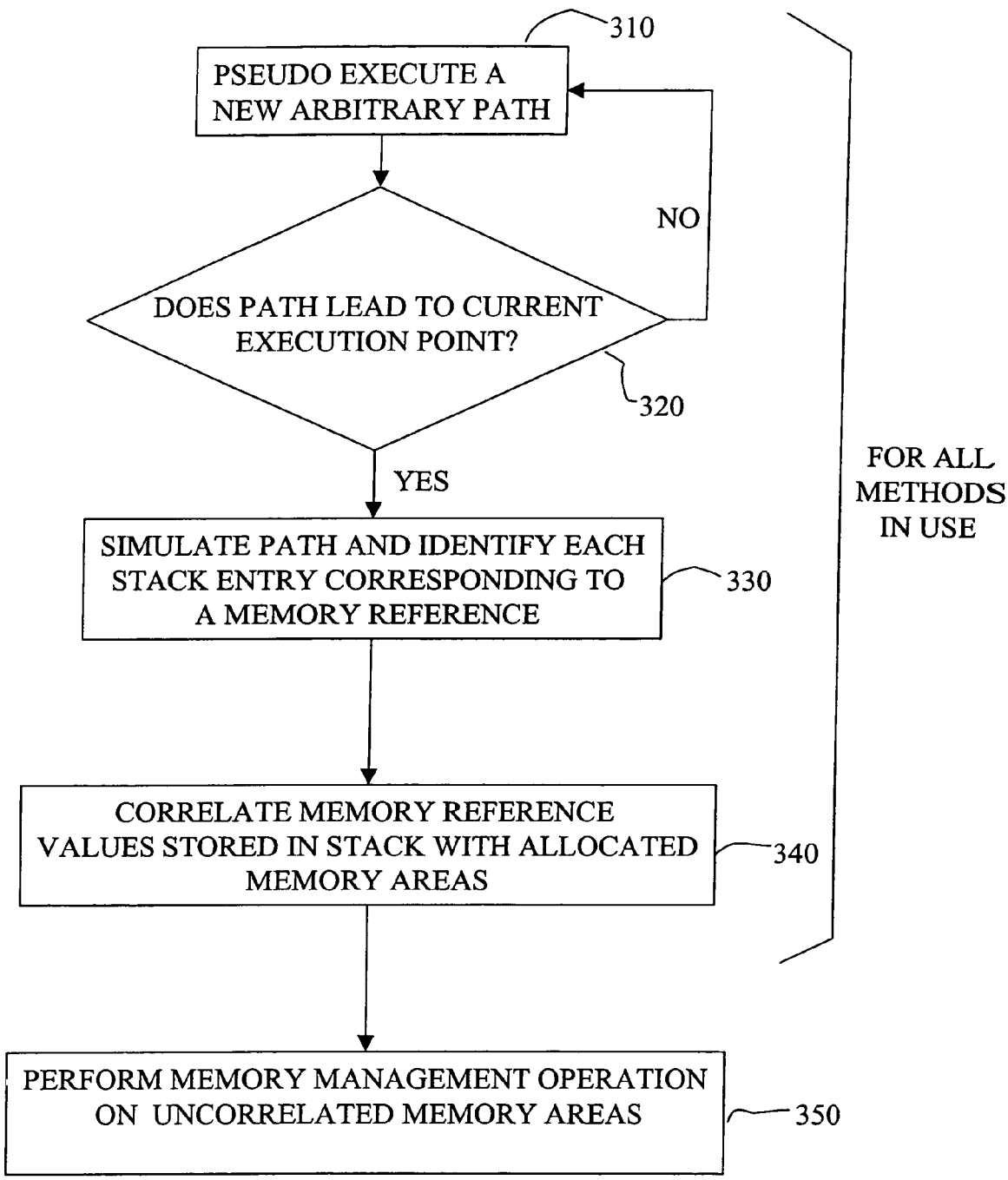
FIG. 3 is a flow diagram that schematically illustrates the process of finding references in the operand stack.
Figure 4:
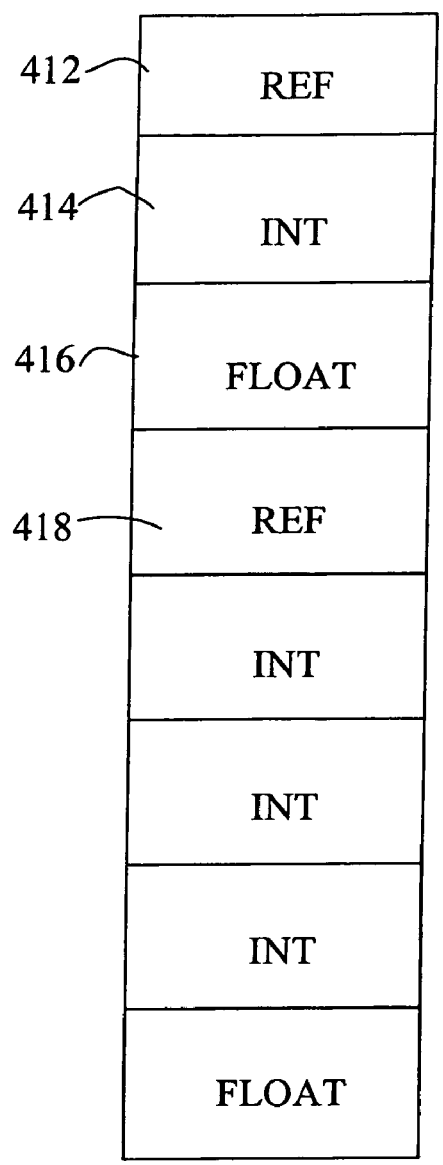
FIG. 4 schematically illustrates the format of an operand stack reference table.
Figure 4:
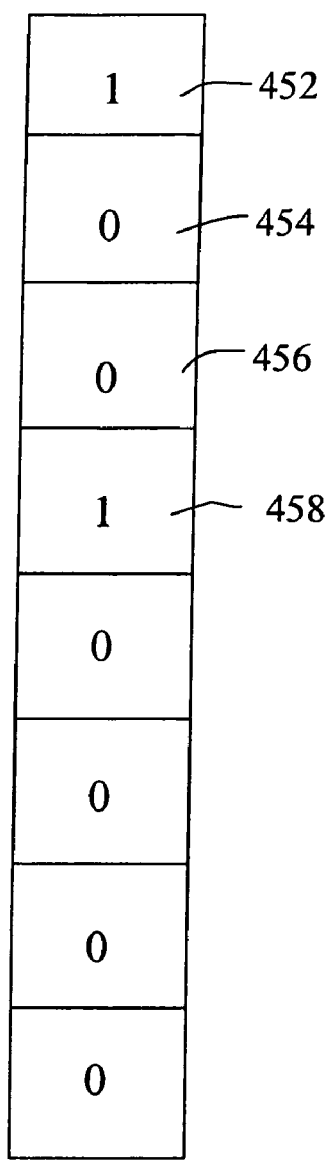

FIG. 3 is a flow diagram that schematically illustrates the process of finding references in the operand stack. According to the present technique an operand stack reference table (akin to a stack map) is dynamically created post-verification at the execution point at which the garbage collection process is initiated. FIG. 4 schematically illustrates the operand stack reference table. In FIG. 4 a logical stack 410 comprising a block of contiguous memory locations or slots is shown and the stack reference table 450 is a bit-vector accompanying the logical stack, which specifies which stack slots contain references. Although in this embodiment the stack comprises a contiguous memory block, in alternative embodiments the stack may comprise non-contiguous memory locations. Stack slots 412, 414, 416, 418 correspond to bit-vector locations 452, 454, 456 and 458 respectively. Each stack slot may be used to store a primitive value such as an integer (INT) or a floating point number (FLOAT) or to store a reference (REF) such as a pointer. Stack slots 412 and 418 contain references and corresponding bit-vector locations 452 and 458 have their tag-bits set to one to reflect this. The garbage collection algorithm can examine the bit-vector to determine which stack slots contain references although the actual data in the logical stack 410 does not positively identify references. Construction of this reference table 450 is achieved by performing a two-pass run over the method code.

The operand stack analysis according to the present technique exploits the following two rules, which are laid down in the JVM specification for Java:

I. "Each instruction must only be executed with the appropriate type and number of arguments in the operand stack and local variable array, regardless of the execution path that leads to its invocation. An instruction operating on values of type int is also permitted to operate on values boolean, byte, char and short."

II. "If an instruction can be executed along several different execution paths, the operand stack must have the same depth prior to execution of the instruction regardless of the path taken".

Since the reference table is created dynamically at the point of initiation of the garbage collection algorithm, there is no information available about the actual execution path followed to arrive at the current execution point. Due to the possibility of if/else branches in the method code, there may well be a plurality of possible execution paths via which a current execution point could be arrived at. In general, whether a given stack frame slot contains a reference at a given point in a method execution depends not only on the current execution point but on the control path followed to arrive at that execution point. For example, along one control path a given stack frame slot could be assigned an integer value whereas along another control path that same stack slot could be assigned a reference.

However, applying the above two rules of the JVM specification it can be deduced that it is not essential to determine the actual execution path in order to identify which slots of the stack will contain references. In fact, it is sufficient to find any of the plurality of possible execution paths that lead to the current execution point and use the found path, which is not necessarily the actual execution path, to generate a stack reference table. The execution path should begin at a bytecode index of zero and terminate at the bytecode index corresponding to the current execution point. The stack reference tables (in which stack slots corresponding to references are tagged) for each of the possible execution paths should be identical provided that rules I and II (see above) of the JVM are adhered to.

Referring now to the flow chart of FIG. 3, the process begins at stage 310 where an arbitrary control path is found. It is subsequently determined at stage 320 whether this path leads to the current bytecode index. If the current execution point is in fact reached via the executed path then the process proceeds to stage 330, otherwise flow control returns to stage 310 where a further path is found. At stage 330 the identified execution path is followed and monitoring operations are performed along the path. In particular, every bytecode of the method area along that path is checked to see if it modifies the stack. This allows stack depth to be tracked and allows monitoring of what variable types are pushed and popped by the stack along the identified execution path. The stack reference table created at stage 330 is used at the subsequent stage 340 to complete the marking process whereby all of the heap memory areas reachable from the roots are positively identified. Thus stage 340 involves correlation of memory reference values stored in stack slots with objects in heap memory to which memory areas have been allocated by the processing task. Stages 310 to 340 are performed for all methods in use. Once the live heap memory areas have been identified at stage 340, the process proceeds to stage 350 where all uncorrelated heap memory areas, which correspond to garbage, are subjected to a memory management operation. The result of the memory management operation is that heap memory areas are freed for reallocation by the executing program.

Figure 5:
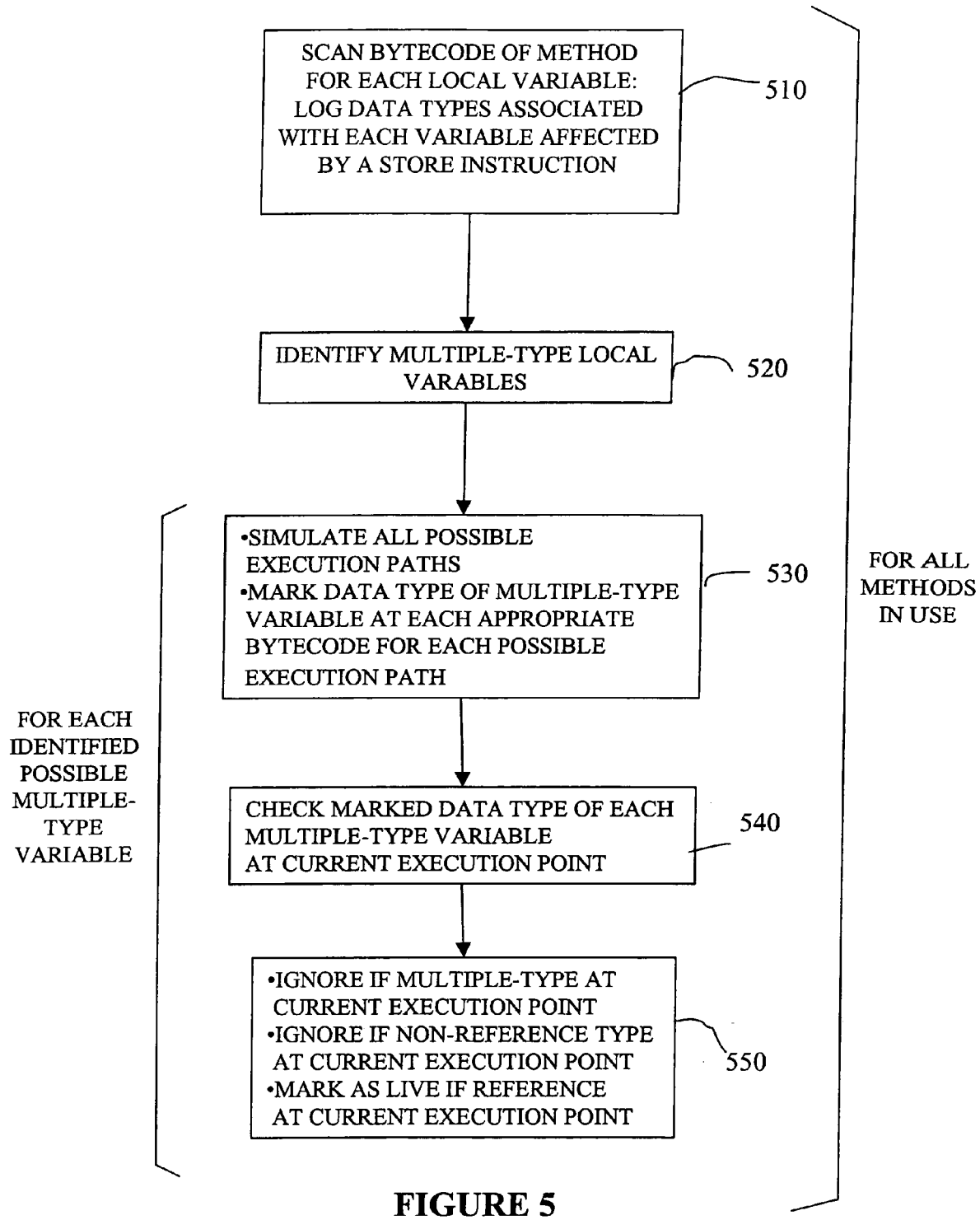
FIG. 5 is a flow diagram that schematically illustrates the process of finding references in a variable list.

FIG. 5 is a flow diagram that schematically illustrates the process of, finding references in a variable list, rather than in an operand stack. The variables used by a method are stored in an array. The variables may be static (global) variables, local variables or arguments of the method. The JVM needs to determine whether each variable in the variable array stores a reference or a non-reference value. The signature of a method specifies the type of each argument, which allows the arguments to be pre-tagged. However, local variables must be marked as un-initialized and tagged later.

There is a problem in categorizing certain variables as references or non-references due to the fact that some variables can be of indeterminate type. This situation can arise for example when there are at least two different control paths leading to a common execution point and the variable is assigned an integer value along one control path but a reference value along the alternative control path. According to rule I above, each instruction must only be executed with the appropriate number and type of arguments in the local variable array, regardless of the execution path that leads to invocation of the instruction. It follows that any local variable that is of indeterminate type at the current execution point is not counted as a reference.

In principle, it is possible for a given variable to be used as a non-reference for one block of a method but as a reference value for another block of the same method. This suggests that a step by step analysis through all control paths may be necessary, tracking the type of each variable for each step of program execution. However, the present technique recognises that multiple-type use of a variable is relatively rare in practice, for example, 5% of variables may be of multiple-type. The fact that the fraction of method variables having multiple-type is small is exploited by performing a two-stage variable analysis. The first stage of variable analysis involves a one-pass scan of all bytecodes of the method to determine which variables are identifiable as multiple-type variables. The second stage of variable analysis involves performing a full data-flow analysis but only for the small proportion of variables identified during the first stage as being multiple-type, the preference being that of checking one variable at a time.

Referring to the flow chart of FIG. 5, the reference identification process for variables begins at stage 510 where the full bytecode of the method is scanned for each local variable. For a given local variable data types associated with each variable affected by a store instruction are logged. One tag bit is allocated to each possible data type. At the end of this stage there is a variable array of size equal to the total number of variables of the method. For each variable the array has a data field indicating all data types associated with that variable at some point during execution of the full method. The process then proceeds to stage 520 where the tag bits of stage 510 are used to discriminate between variables of multiple-type and variables of known type. At stage 530 a full data-flow analysis is performed for each multiple-type variable. The full data-flow analysis involves following all possible execution paths through the bytecode for each multiple-type variable and logging the data type of the variable at each bytecode. Accordingly, at the end of this stage there is an array as long as the number of bytecodes in the method for each multiple-type variable. The process then proceeds to stage 540 where the garbage collection algorithm checks each multiple-type variable array entry corresponding to the bytecode number of the current execution point to establish the actual data type of the multiple-type variable at the current execution point. Once the data type at the current execution point has been established at stage 540, the process proceeds to stage 550 where the memory management operation is performed. If the multiple-type variable was found to be a reference value at the current execution point EP then it is marked as live. If however the multiple-type variable was found to be a known type but a non-reference it is ignored. Similarly, if the multiple-type variable was found to be of indeterminate data type at the current execution point it is ignored. Following stage 550, which is the first stage of the marking process, subsequent stages of the garbage collection process may be performed using a conventional technique. Stages 510 to 550 are performed for all methods in use. Stages 530 to 550 are performed for each identified possible multiple-type variable.

Figure 6:
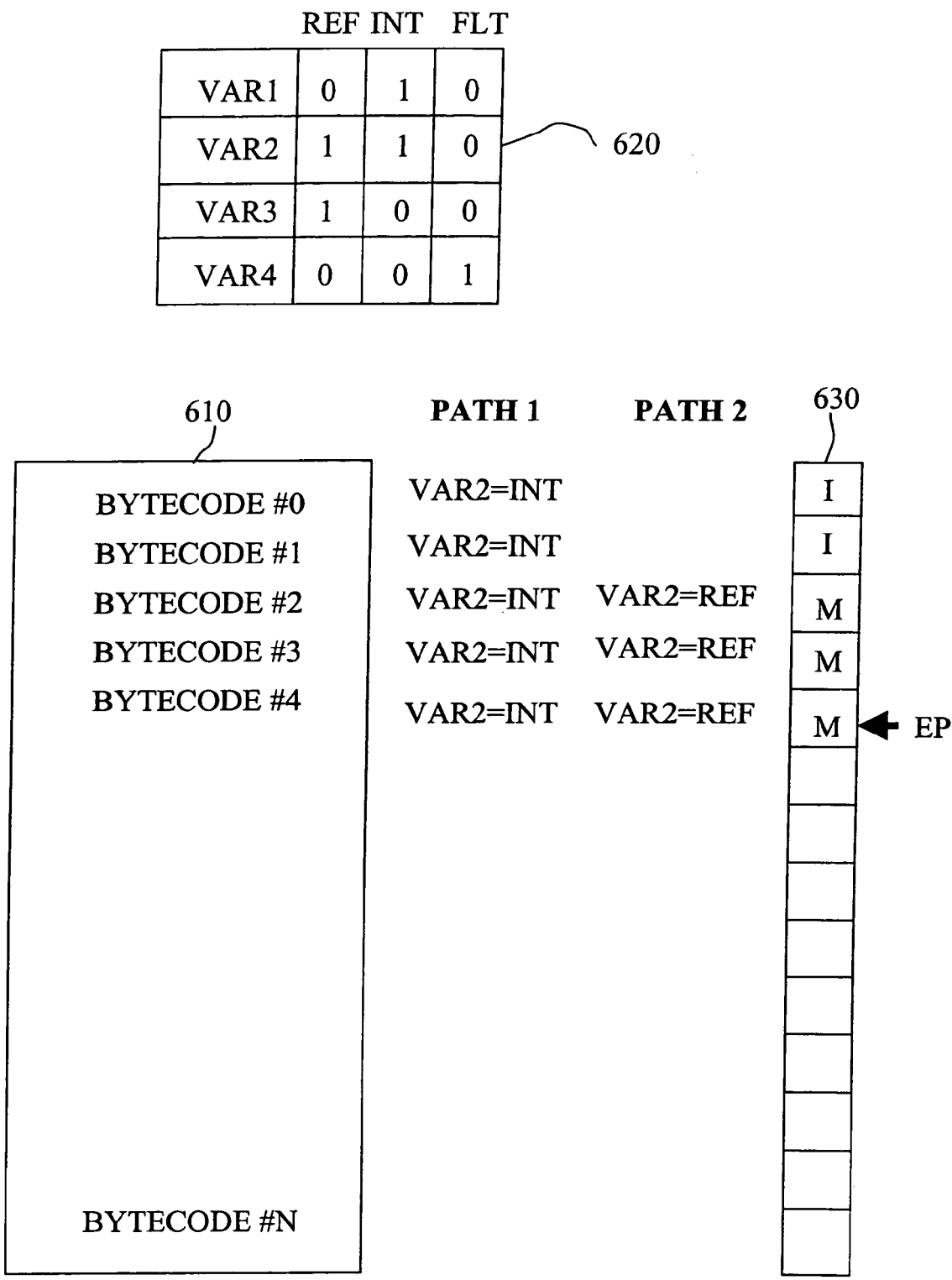
FIG. 6 schematically illustrates the three stages of the process of reference identification for variables corresponding to the flow chart of FIG. 5.

FIG. 6 schematically illustrates the three stages of the process of reference identification for variables according to the present technique. The first stage of the process involves scanning all bytecodes in the method area 610 and logging each relevant store instruction for each local variable. The results of this logging process are compiled as a variable table 620 which lists each of the local variables VAR1, VAR2, VAR3 and VAR4 and has a tag bit for each of the possible data types which are reference (REF), integer (INT) and floating point (FLT) for the purposes of this example. The second stage of the process involves examining the number of bits set in the variable table 620 for each local variable. It can be seen from the variable table 620 that VAR1, VAR3 and VAR4 are of known types INT, REF and FLT respectively. Each of these three variables is associated with a single data type for all bytecodes 610 of the method. However, VAR2 has been flagged as both a reference and an integer and hence is identified as a multiple-type (or indefinite type) variable. The third stage of the process involves creation of an array 630 for the multiple-type variable VAR2 with as many elements as there are bytecodes in the method area 610. A full data-flow analysis is performed for VAR2 to determine the possible variable-type of VAR2 at each bytecode. In this case there are two possible paths to a current execution point EP at bytecode #4 that must be considered. On path 1 VAR2 has an integer value from bytecode #0 through bytecode #4 whereas on path 2 VAR2 is uninitialised for bytecode #1 and bytecode #2 but assumes a reference value for bytecode #3 and bytecode #4. Accordingly the VAR2 array 630 has the entry I (corresponding to integer) at bytecodes #1 and #2, but has the entry M (multiple-type) at bytecodes #3 and #4. Since VAR2 has an integer value on path 1 and a reference value on path 2 at the current execution point it is of indeterminate type and hence is not marked as a live object.

The method of identifying references in a variable array according to the present technique has the advantage that it prevents variables having indeterminate type at the current execution point being erroneously marked as live objects, i.e. this technique effectively provides precise garbage collection.

The Java Virtual Machine specification states that "heap storage for objects is reclaimed by an automatic storage management system". The JVM assumes no particular type of automatic storage management system, and the storage management technique may be chosen according to the system requirements of the implementor. However, all popular implementations of Java (such as those by Sun® and Microsoft®) use garbage collection.

Garbage collection is typically run automatically by the JVM, although it may be possible to turn off garbage collection by starting Java with a particular option. If garbage collection is turned off in a program that may run for an extended period, the program is likely to fail with memory exhaustion before execution is complete. The JVM typically provides the user with the option to explicitly call a garbage collection method so that garbage collection can be performed at any point in the code execution specified by the user.

Figure 7:
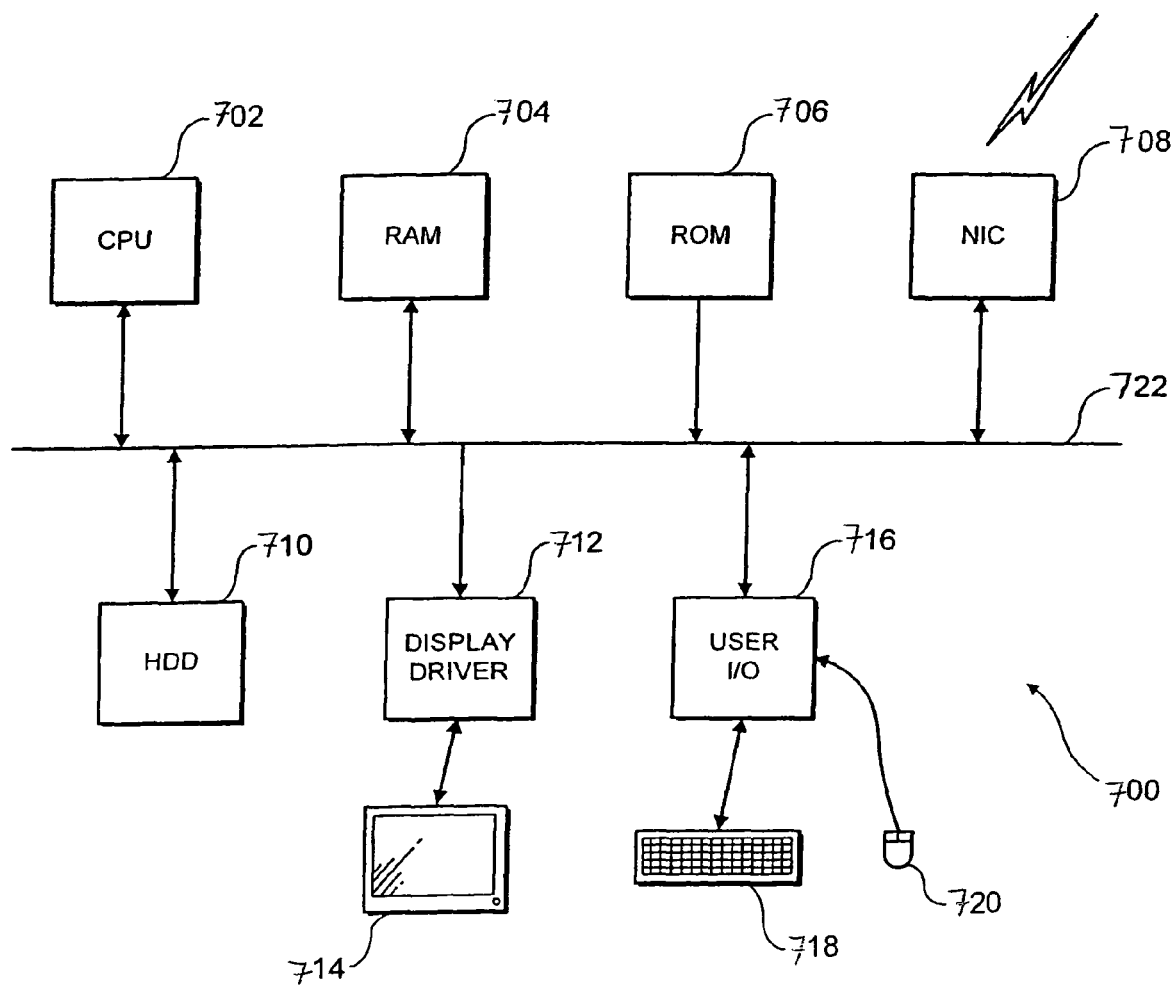
FIG. 7 schematically illustrates a general purpose computer of the type that may be used to implement the present technique.

FIG. 7 schematically illustrates a general purpose computer 700 of the type that may be used to implement the above described techniques. The general purpose computer 700 includes a central processing unit 702, a random access memory 704, a read only memory 706, a network interface card 708, a hard disk drive 710, a display driver 712 and monitor 714 and a user input/output circuit 716 with a keyboard 718 and mouse 720 all connected via a common bus 722. In operation the central processing unit 702 will execute computer program instructions that may be stored in one or more of the random access memory 704, the read only memory 706 and the hard disk drive 710 or dynamically downloaded via the network interface card 708. The results of the processing performed may be displayed to a user via the display driver 712 and the monitor 714. User inputs for controlling the operation of the general purpose computer 700 may be received via the user input output circuit 716 from the keyboard 718 or the mouse 720. It will be appreciated that the computer program could be written in a variety of different computer languages. The computer program may be stored and distributed on a recording medium or dynamically downloaded to the general purpose computer 700. When operating under control of an appropriate computer program, the general purpose computer 700 can perform the above described techniques and can be considered to form an apparatus for performing the above described technique. The architecture of the general purpose computer 700 could vary considerably (e.g. hand-held games computers, mobiles, personal digital assistants etc.) and FIG. 7 is only one example.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A method of controlling execution of a processing task within a data processing system, said method comprising the steps of:
executing said processing task including allocating memory areas for data storage; and
suspending an actual execution path of said processing task at an execution point to perform memory management, said memory management comprising the steps of:
identifying at least one data item roots occurring in the course of execution and accessible to said processing task at said execution point which specify reference values pointing to respective ones of said memory areas;
determining a correlation between reference values corresponding to said at least one data item roots and memory areas allocated during said execution up to said execution point by identifying at least one data item reachable from said at least one data item roots;
performing a memory management operation on allocated memory areas in dependence upon said correlation;
wherein said identifying step comprises:
identifying a possible execution path leading to said execution point, wherein said possible execution path may be different from said actual execution path; performing a simulated execution of said possible execution path; and
wherein said at least one data item roots and said at least one data item accessible to said processing task are identified by following said possible execution path to said current execution point.

2. A method as claimed in claim 1, wherein each of said at least one data items is an operand.

3. A method as claimed in claim 1, wherein said memory management operation comprises marking all of said memory areas that are accessible to said processing task either directly or indirectly through said identified data items and collecting unmarked memory areas for re-allocation during subsequent execution of said processing task.

4. A method as claimed in claim 3, wherein said memory management operation comprises compacting said unmarked memory areas prior to re-allocation.

5. A method as claimed in claim 1, wherein each of said at least one data items is a local variable.

6. A method as claimed in claim 5, wherein said identifying step comprises:
scanning a plurality of program instructions corresponding to said processing task and logging a data type for each store instruction corresponding to each of said at least one data items;
categorizing at least one of said data item roots or said at least one data item as a multiple-type variable if different data types are logged for different store instructions for a respective data item;
simulating all possible execution paths up to said execution point for each of said at least one data item root or said at least one data item categorized as a multiple-type variable and determining the data type associated with each multiple-type variable at each of said plurality of program instructions for each of said possible execution paths; and
checking said determined data type for each of said multiple-type variables at one of said plurality of program instructions corresponding to said current execution point; and
said memory management operation is performed in dependence upon a result of said step of checking said determined data type.

7. A method as claimed in claim 6, wherein said memory management operation involves tagging said at least one data item as suitable for reallocation if said determined data type is different for different ones of said possible execution paths at said current execution point.

8. A method as claimed in claim 1, wherein said processing task is a component of a computer program written in an object-oriented programming language.

9. A method as claimed in claim 8, wherein said object-oriented programming language is Java.

10. A computer program product comprising a non-transitory computer readable storage medium comprising computer readable instructions that, when executed, cause a computer to control execution of a processing task within a data processing system, said computer program comprising:
   execution code operable to execute said processing task including allocating memory areas for data storage; and
   suspending code operable to suspend an actual execution path of said processing task at an execution point to perform memory management;
   reference identifying code operable to identify at least one data item roots occurring in the course of execution and accessible to said processing task at said execution point which specify reference values pointing to respective ones of said memory areas;
   correlating code operable to determine a correlation between reference values corresponding to said identified data item root and memory areas allocated during said execution up to said execution point;
   memory management code operable to perform a memory management operation on allocated memory areas in dependence upon said correlation;
   wherein said reference identifying code comprises:
   path identifying code operable to identifying a possible execution path leading to said execution point, wherein said possible execution path may be different from said actual execution path;
   path simulation code operable to perform a simulated execution of said possible execution path; and
   wherein said at least one data item root and said at least one data item accessible to said processing task are identified by following said possible execution path to said current execution point.

11. A computer program product as claimed in claim 10, wherein each of said at least one data items is an operand.

12. A computer program product as claimed in claim 10, wherein said memory management code is operable to mark all of said memory areas that are accessible to said processing task either directly or indirectly through said identified data items and to collect unmarked memory areas for re-allocation during subsequent execution of said processing task.

13. A computer program product as claimed in claim 12, wherein said memory management code is operable to compact said unmarked memory areas prior to re-allocation.

14. A computer program product as claimed in claim 10, wherein each of said one or more data items is a local variable.

15. A computer program product as claimed in claim 14, wherein said reference identifying code comprises:
   scanning code operable to scan a plurality of program instructions corresponding to said processing task and to log a data type for each store instruction corresponding to each of said one or more data items;
   categorizing code operable to categorize at least one of said one or more data items as a multiple-type variable if different data types are logged for different store instructions for a respective data item;
   path simulation code operable to simulate all possible execution paths up to said execution point for each of said at least one data item root or said at least one data item categorized as a multiple-type variable and to determine the data type associated with each multiple-type variable at each of said plurality of program instructions for each of said possible execution paths; and
   data type checking code operable to check said determined data type for each of said multiple-type variables at one of said plurality of program instructions corresponding to said current execution point; and
   wherein said memory management code is operable to perform said memory management operation in dependence upon a result of said data type checking code.

16. A computer program product as claimed in claim 15, wherein said memory management code is operable to tag said at least one data item as suitable for reallocation if said determined data type is different for different ones of said possible execution paths at said current execution point.

17. A computer program product as claimed in claim 10, wherein said processing task is a component of a computer program written in an object-oriented programming language.

18. A computer program product as claimed in claim 17, wherein said object-oriented programming language is Java.

19. A data processing apparatus operable to control execution of a processing task within a data processing system, said data processing apparatus comprising:
   a processor and a memory;
   execution logic operable to execute said processing task including allocating memory areas for data storage; and
   task suspension logic operable to suspend an actual execution path of said processing task at an execution point to perform memory management;
   reference identifying logic operable to identify at least one data item occurring in the course of execution and accessible to said processing task at said execution point which specify reference values pointing to respective ones of said memory areas;
   correlation logic operable to determine a correlation between reference values corresponding to identified said at least one data item root and memory areas allocated during said execution up to said execution point by identifying at least one data item reachable from said at least one data item root;
   memory management logic operable to perform a memory management operation on allocated memory areas in dependence upon said correlation;
   wherein said reference identifying logic comprises:
   path identifying logic operable to identify a possible execution path leading to said execution point, wherein said possible execution path may be different from said actual execution path;
   path simulation logic operable to perform a simulated execution of said possible execution path; and
   wherein said at least one data item and said at least one data item root accessible to said processing task are identified by following said possible execution path to said current execution point.

20. A data processing apparatus as claimed in claim 19, wherein each of said one or more data items is an operand.

21. A data processing apparatus as claimed in claim 19, wherein said memory management logic is operable to mark all of said memory areas that are accessible to said processing task either directly or indirectly through said identified data items and collecting unmarked memory areas for re-allocation during subsequent execution of said processing task.

22. A data processing apparatus as claimed in claim 21, wherein said memory management logic is operable to compact said unmarked memory areas prior to re-allocation.

23. A data processing apparatus as claimed in claim 19, wherein each of said at least one data items is a local variable.

24. A data processing apparatus as claimed in claim 23, wherein said reference identifying logic comprises:
  scanning logic operable to scan a plurality of program instructions corresponding to said processing task and logging a data type for each store instruction corresponding to each of said one or more data items;
  categorizing logic operable to categorize at least one of said at least one data item roots or said at least one data item as a multiple-type variable if different data types are logged for different store instructions for a respective data item;
  path simulation logic operable to simulate all possible execution paths up to said execution point for each of said at least one data item root or said at least one data item categorized as a multiple-type variable and to determine the data type associated with each multiple-type variable at each of said plurality of program instructions for each of said possible execution paths; and
  data type checking logic operable to check said determined data type for each of said multiple-type variables at one of said plurality of program instructions corresponding to said current execution point; and
  said wherein memory management logic is operable to perform said memory management operation in dependence upon a result of checking said determined data type.

25. A data processing apparatus as claimed in claim 24, wherein said memory management logic is operable to tag said data item as suitable for reallocation if said determined data type is different for different ones of said possible execution paths at said current execution point.

26. A data processing apparatus as claimed in claim 19, wherein said processing task is a component of a computer program written in an object-oriented programming language.

27. A data processing apparatus as claimed in claim 26, wherein said object-oriented programming language is Java.

28. A method of identifying for a memory management operation at least one data item root and at least one data item reachable from said data item root comprising the steps of:
  scanning a plurality of program instructions corresponding to said processing task and logging a data type for each store instruction corresponding to each of said at least one data item;
  categorizing at least one of said at least one data item root or said at least one data item as a multiple-type variable if different data types are logged for different store instructions for a respective data item;
  simulating all possible execution paths up to said execution point for each of said at least one data item root or said at least one data item categorized as a multiple-type variable and determining the data type associated with each multiple-type variable at each of said plurality of program instructions for each of said possible execution paths; and
  checking said determined data type for each of said multiple-type variables at one of said plurality of program instructions corresponding to said current execution point,
  wherein said memory management operation is performed in dependence upon a result of said step of checking said determined data type.

29. A computer program product comprising a non-transitory computer readable storage medium comprising computer readable instructions that, when executed, control a computer to identify for a memory management operation performed by memory management code at least one data item root and at least one data item reachable from said at least one data item root, wherein each of said at least one data item is a local variable, comprising:
  scanning code operable to scan a plurality of program instructions corresponding to said processing task and to log a data type for each store instruction corresponding to each of said at least one data item;
  categorizing code operable to categorize at least one of said at least one data item as a multiple-type variable if different data types are logged for different store instructions for a respective data item;
  path simulation code operable to simulate all possible execution paths up to said execution point for each of said at least one data item root or said at least one data item categorized as a multiple-type variable and to determine the data type associated with each multiple-type variable at each of said plurality of program instructions for each of said possible execution paths; and
  data type checking code operable to check said determined data type for each of said multiple-type variables at one of said plurality of program instructions corresponding to said current execution point,
  wherein said memory management code is operable to perform said memory management operation in dependence upon a result of said data type checking code.

30. A data processing apparatus for identifying, for a memory management operation performed by memory management logic, at least one data item root and at least one data item reachable from said at least one data item root, wherein each of said at least one data item is a local variable, comprising:
  a processor and a memory;
  scanning logic operable to scan a plurality of program instructions corresponding to said processing task and logging a data type for each store instruction corresponding to each of said at least one data item;
  categorizing logic operable to categorize at least one of said at least one data item root or said at least one data item as a multiple-type variable if different data types are logged for different store instructions for a respective data item;
  path simulation logic operable to simulate all possible execution paths up to said execution point for each of said at least one data item root or said at least one data item categorized as a multiple-type variable and to determine the data type associated with each multiple-type variable at each of said plurality of program instructions for each of said possible execution paths; and
  data type checking logic operable to check said determined data type for each of said multiple-type variables at one of said plurality of program instructions corresponding to said current execution point,
  wherein said memory management logic is operable to perform said memory management operation in dependence upon a result of checking said determined data type.

* * * * *